United States Patent [19]

Geisthoff et al.

[11] 4,326,392
[45] Apr. 27, 1982

[54] MULTIPARTITE PROTECTIVE DEVICE FOR UNIVERSAL JOINT SHAFTS

[75] Inventors: Hubert Geisthoff; Clemens Nienhaus, both of Lohmar, Fed. Rep. of Germany

[73] Assignee: Jean Walterscheid GmbH, Lohmar, Fed. Rep. of Germany

[21] Appl. No.: 158,254

[22] Filed: Jun. 10, 1980

[30] Foreign Application Priority Data

Jun. 23, 1979 [DE] Fed. Rep. of Germany ....... 2925398

[51] Int. Cl.³ .............................................. F16C 1/06
[52] U.S. Cl. .............................................. 64/3; 64/4; 403/23; 403/372
[58] Field of Search ................... 403/23, 372, 13, 14, 403/359, 286; 74/11; 64/4, 3

[56] References Cited

U.S. PATENT DOCUMENTS

| | | | |
|---|---|---|---|
| 1,012,909 | 12/1911 | Podeyn | 64/3 |
| 2,952,142 | 9/1960 | Schroter et al. | 64/4 |
| 3,031,865 | 5/1962 | Weasler | 64/3 |
| 3,113,441 | 12/1963 | Weasler | 64/3 |
| 3,415,153 | 12/1968 | Steiner | 403/372 X |
| 3,515,417 | 6/1970 | Bowman | 403/372 X |

FOREIGN PATENT DOCUMENTS

| | | | |
|---|---|---|---|
| 16949 | 2/1913 | Denmark | 64/3 |
| 1209366 | 1/1966 | Fed. Rep. of Germany . | |

*Primary Examiner*—Andrew V. Kundrat
*Attorney, Agent, or Firm*—Toren, McGeady & Stanger

[57] ABSTRACT

A multipartite protective device for universal joint shafts is formed with inner and outer telescoping protective tubes concentrically arranged with a plurality of elastic braking tongues being frictionally interposed between the tubes to prevent relative rotative motion therebetween, the elastic braking tongues extending in an arcuate configuration curved in the circumferential direction of the tubes with the braking tongues being arranged in pairs, the braking tongues of each pair being curved in opposed circumferential directions.

2 Claims, 4 Drawing Figures

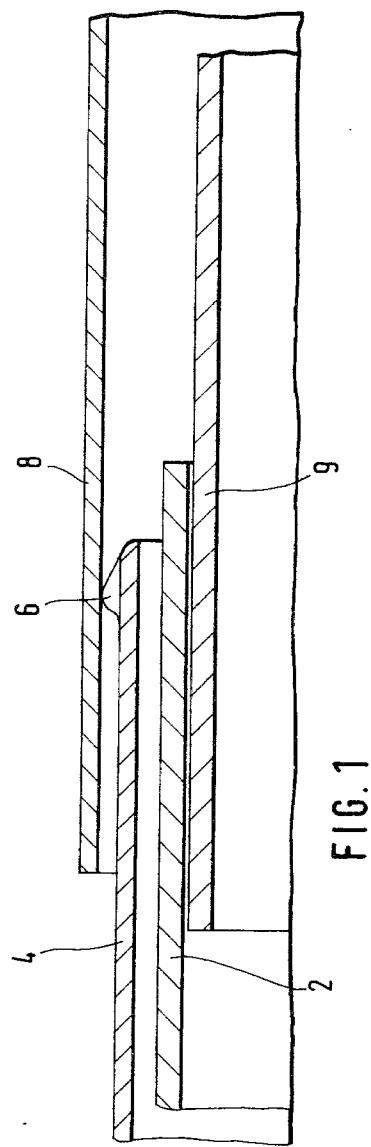
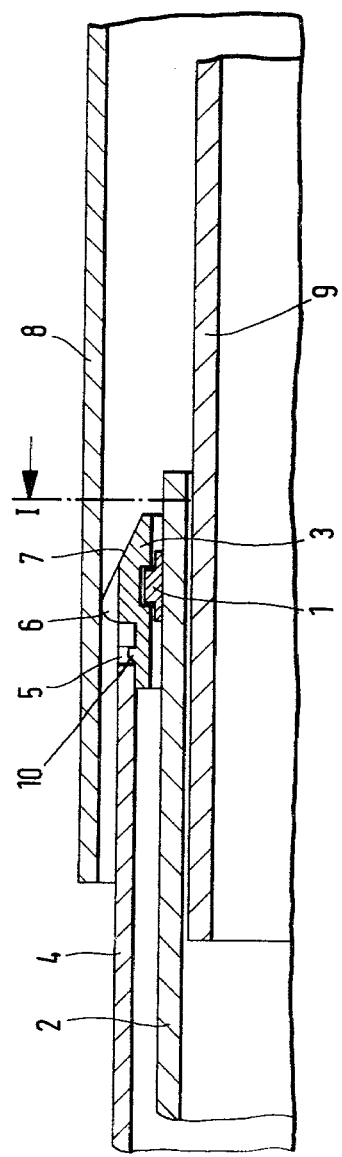

MULTIPARTITE PROTECTIVE DEVICE FOR UNIVERSAL JOINT SHAFTS

The present invention relates generally to multipartite protective devices for universal joint shafts particularly of the type utilized in agricultural machinery. More specifically, the protective device of the invention involves at least two telescoping cylindrical protective tubes which are frictionally connected with each other.

It is known in protective devices for universal joint shafts in accordance with the prior art, particularly German Pat. No. 1,209,366, to frictionally connect the telescoping protecting protective tubes with resilient means. The prior art describes a protective device wherein an axially extending bent flat spring engages through two slots of an inner protective tube and is supported with its inner area at the outer protective tube.

A disadvantage of arrangements formed in accordance with the prior art involves the fact that the two protective tubes have a large contact area at the side opposite the flat spring. Since in agricultural equipment it is difficult to prevent dirt from entering the apparatus, heavy increases in friction may be expected in this area whereby there will result increased wear of parts. Additionally, axial mobility of the two protective tubes will be considerably impaired as a result.

The present invention is directed toward provision of an effective frictional connection between the two protective tubes of a protective device for universal joint shafts which will prevent relative rotation of one tube with respect to the other and which is to a substantial extent insensitive to dirt and which involves minor expenses requiring no additional assembly costs.

SUMMARY OF THE INVENTION

In accordance with the present invention, elastic braking tongues are uniformly distributed about the outer periphery of an inner protective tube, or alternatively at an annular portion connected with the inner protective tube, with the elastic braking tongues extending to the inner surface of the outer protective tube starting from the outer surface of the inner protective tube, the tongues being formed with an arcuate configuration and preferably arranged in pairs, with the tongues of each pair being oppositely curved.

In the embodiment described herein, the braking tongues have the advantage that the inner and outer protective tubes may be maintained concentric relative to each other. Since the braking tongues are supported with line contact at the outer protective tube, and since no area contact occurs due to the concentric alignment of the two protective tubes, frictional connection of the two tubes with each other is to a large extent not influenced by the presence of dirt or deleterious material.

Because of the frictional engagement between the protective tubes, the connection of one tube to a holding chain will be sufficient for protection against rotation. The other protective tube may also be held by means of the frictional engagement.

Additionally, with the appropriate selection of the angle of pitch of the braking tongues, the coefficient of frictional engagement between the two protective tubes may be increased up to a point where a self-locking condition exists.

In an advantageous aspect of the invention, the protective device may be supported in each pulled-out position in such a manner that it may withstand radial loads by equipping the device with a support bearing which is constructed of an inner and an outer bearing member which also effects the frictional connection between the inner and the outer protective tube.

Support bearings which support the inner protective tube against the universal joint shaft are known. However, since they are connected with a section tube of the universal joint shaft in an axially movable manner, they cannot support the protective tubes against each other. The expanded capability of the invention is provided in that the braking tongues are arranged at the periphery of the outer bearing member with the outer bearing member being attached at the insertion end of the inner protective tube.

Due to the combination of a support bearing with protection against rotation of the two protective tubes, a protective device for universal joint shafts which is especially accident-proof may be provided in a relatively simple manner.

It is especially advantageous that the outer protective tube may deform under radial stress, for instance by a part of the human body, so that an interlocking connection between the two protective tubes will result.

In a further embodiment of the invention, the braking tongues are arranged in pairs, with the braking tongues of each pair being curved in opposite circumferential directions.

In accordance with a further feature of the invention, at the insertion end of the outer bearing member a lead-in cone is provided with the lead-in cone having a slope which is continuous with a slope of the braking tongue.

Due to the installation of the lead-in cone, continuing in the slope of the braking tongues, easy telescopic action of the two protective tubes will result at the insertion side of the outer bearing member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial cross-sectional view of a device in accordance with the invention wherein the braking tongues are arranged on the outer periphery of the inner protective tube;

FIG. 2 is a partial cross-sectional view of a protective device wherein the inner protective tube is supported by a bearing ring against the outer section tube of the universal joint shaft and wherein the braking tongues are provided at the outer periphery of the outer bearing member;

DETAILED DESCRIPTION OF THE PREFERRED EMBODIMENTS

Figure 3:
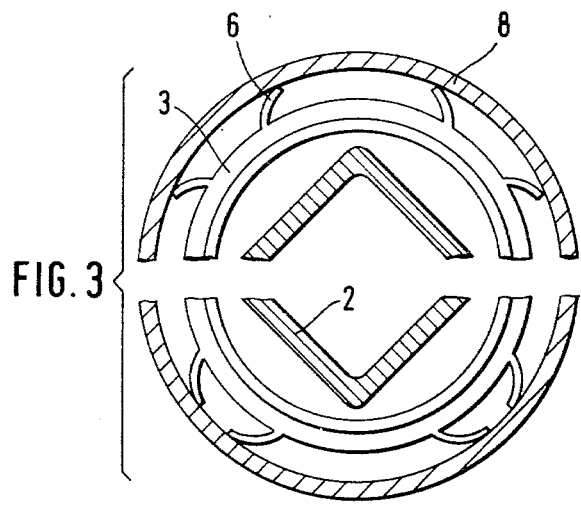
FIG. 3 is a cross-sectional view through the protective device of FIG. 2.

Referring now to the drawings wherein similar reference numerals are used to identify similar parts throughout the various figures thereof, there is shown in FIG. 1 a universal joint shaft which is composed of an inner section tube 9 and an outer section tube 2 which are enclosed by a protective device composed of an inner protective tube 4 and an outer protective tube 8.

A plurality of braking tongues 6 are provided at the outer periphery of the protective tube 4 with the tongues 6 acting as frictional engaging means extending between the inner protective tube 4 and the outer protective tube 8. It therefore becomes sufficient to secure one of the protective tubes against rotation, for example by means of an attached chain, inasmuch as protection or resistance against rotation of the other protective tube will be effected by the frictional engagement of the braking tongues 6.

In FIG. 2 there is shown an inner bearing ring 1 which is guided on the outer section tube 2 in a nonrotatable but axially slideable manner. The bearing ring 1 is enclosed by an outer bearing ring 3. The outer bearing ring 3 is connected with the inner protective tube 4 by means of a catch cam 10 which engages within an aperture 5 of the inner protective tube 4.

The outwardly directed braking tongues 6 supported at the inside of the outer protective tube 8 are arranged at the outer periphery of the outer bearing ring 3.

In FIG. 3, there is shown a sectional view through the protective device shown in FIG. 2. In the upper half of the sectional view of FIG. 3, the supporting tongues 6 are arranged in pairs facing in opposite directions as shown. That is, each pair of tongues 6 is formed with an arcuate configuration curved in an opposed circumferential direction relative to the other tongue of the pair.

In the lower half of the sectional view of FIG. 3 the braking tongues 6 are likewise curved in opposed directions but the tongues of the pair are instead curved in a direction toward each other. Both of the embodiments depicted in FIG. 3 are equal in their effectiveness.

Figure 4:
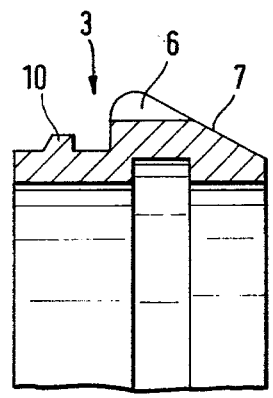
FIG. 4 is a partial sectional view of the outer bearing ring with the braking tongues.

In FIG. 4, the outer bearing ring 3 is shown in greater detail. As will be seen in FIG. 4, the outer bearing ring 3 is formed with a continuation which defines a conical surface or a lead-in cone 7. As will be apparent from FIG. 4, the slope of the conical surface 7 extends continuously relative to a conical slope of the braking tongue 6.

While specific embodiments of the invention have been shown and described in detail to illustrate the application of the inventive principles, it will be understood that the invention may be embodied otherwise without departing from such principles.

What is claimed is:

1. A multipartite protective device particularly for universal joint shafts on agricultural machinery comprising inner and outer telescoping cylindrical protective tubes concentrically arranged with an outer surface of the inner tube located within and surrounded by the inner surface of the outer protective tube and means frictionally interposed between said tubes to prevent relative rotative motion therebetween, said frictionally interposed means comprising elastic braking tongues rotatably fixed relative to one of said tubes and extending into frictional engagement with the other of said tubes, said universal joint shafts including an outer section tube arranged within said inner protective tube, with support bearing means comprising an inner and an outer bearing member being arranged between said outer section tube and said inner protective tube, said outer bearing member being attached to the insertion end of said inner protective tube, with said elastic braking tongues being arranged at the periphery of said outer bearing member.

2. A device according to claim 1 wherein a conical surface is provided at an inner insertion end of said outer bearing member, said elastic braking tongues being provided with a sloped configuration which is continuous with said conical surface.

* * * * *